United States Patent [19]

Beyersdorf

[11] 4,139,770

[45] Feb. 13, 1979

[54] SMOKE ALARM

[76] Inventor: Hartwig Beyersdorf, Konsulweg 29, D-2409 Scharbeutz, Fed. Rep. of Germany

[21] Appl. No.: 853,464

[22] Filed: Nov. 21, 1977

[30] Foreign Application Priority Data

Nov. 22, 1976 [DE] Fed. Rep. of Germany ....... 2652970

[51] Int. Cl.[2] ............ G01T 1/18
[52] U.S. Cl. ............ 250/381; 340/629
[58] Field of Search ............ 250/381, 385; 340/629

[56] References Cited

U.S. PATENT DOCUMENTS

| | | | |
|---|---|---|---|
| 3,959,788 | 5/1976 | Tipton et al. | 250/381 |
| 4,075,487 | 2/1978 | Larsen | 250/381 |
| 4,082,952 | 4/1978 | DePoitier et al. | 250/381 |

*Primary Examiner*—Davis L. Willis
*Attorney, Agent, or Firm*—Toren, McGeady and Stanger

[57] ABSTRACT

In the disclosed ionization fire alarm structure, a gap that admits ambient air to the alarm test chamber eliminates directional smoke sensitivity or any insensitivity that might be caused by high air velocities. A ring shaped wall section in the approximate plane of the center electrode and common to the test and reference chambers, and an axially extending tubular wall and housing that enclose the jacket of a flat-bottomed external electrode establish the gap that admits ambient air to the test chamber and form axially compact device with adequate electrical insulation. An insulator cover and angular bends which are formed in the latch springs that couple the alarm to the base prevent unauthorized disassembly by requiring a special manipulation to uncouple these components.

16 Claims, 5 Drawing Figures

SMOKE ALARM

BACKGROUND OF THE INVENTION

Field of the Invention

This invention relates to fire and smoke alarms and more particularly, to an ionization fire alarm that has an ambient air test chamber which is axially aligned with and connected electrically in series to a reference chamber, and the like.

DESCRIPTION OF THE PRIOR ART

Clearly, there is a need for compact and efficient smoke and fire alarms that have a pleasing and inconspicuous appearance. Devices of this nature, to be effective, must satisfy a number of demanding requirements. They must, for example, be relatively inexpensive to manufacture, sensitive to smoke flowing from any direction and proof against unauthorized disassembly by children or vandals. Depending on the type smoke or fire alarm that is under consideration, there may be even further requirements. Thus, one type alarm relies on the ionization of gases within test and reference chambers in order to initiate an alarm signal. If gas is permitted to flow through the test chamber at relatively high velocities, the ions may be swept out of the chamber without enabling the necessary alarm conditions to be established.

Published German patent application No. 20 29 485 of the Federal Republic of Germany shows just such a fire alarm. In this case the ring shaped wall section of the insulator is located approximately in the plane of the internal electrode, and the tubular wall section joined to the inside of the tubular housing section extends, if viewed from the test chamber, axially inward or rearward, so that it surrounds a space behind the reference chamber, where the switching elements of the electrical analyzer circuit connected to the chamber electrodes can be accommodated. The axial length of this alarm is relatively great. Furthermore, the housing of this alarm is a bowl-like development that also forms an external test chamber electrode. To permit ambient air to flow into the test chamber, a plurality of openings is provided on the circumference and near the front of the tubular housing section. This results in alarm sensitivity that is an undesirably strong function of the flow direction from which the ambient air approaches the alarm. Thus, radially approaching ambient air flow can enter and leave the test chamber through openings that face each other, thereby producing a strong through-flow. In contrast, an axial approach flow does not have a direct entrance for ambient air into the test chamber.

Furthermore, published German patent application No. 22 50 820 shows an ionization fire alarm in which a ring-shaped insulator component that carries the center electrode lies approximately in the center electrode plane. A tubular insulator component placed near the inside of the tubular housing section extends from the ring-shaped insulator component outward in an axial direction and surrounds part of the test chamber.

In this case, air is admitted into the test chamber, however, in a manner similar to the previously explained fire alarm. This again results in the sensitivity of the device being a substantial function of the smoke approach flow direction. Furthermore, in this particular case, the switching elements of the analyzer circuit are axially placed behind the reference chamber, which once more results in a design of relatively great axial length.

Another ionization fire alarm, described in German Pat. No. DAS 21 30 889, has a test chamber and a reference chamber that are axially spaced apart to accommodate between them the switching elements of the analyzer circuit. In the chambers, two interconnected electrodes are joined to produce a center electrode. This alarm also has an insulator in which a ring-shaped wall section lies approximately in the plane of the rear electrode component of the center electrode. A tubular wall section that is applied to the inside and outside of a tubular housing section axially extends — by surrounding the volume which is occupied by the analyzer circuit — from the ring-shaped wall section approximately to the plane of the forward component of the center electrode. Because of the axial separation of both chambers, this type of device also requires a relatively extensive axial length. The two electrodes that are part of the center electrode in this device also involve higher costs. The housing simultaneously provides an external electrode for the test chamber, protection against strong air currents and a degree of sensitivity that is unaffected by the smoke flow direction. This is achieved through the use of two walls, in which the openings provided in the inner housing wall are offset relative to the openings in the outer wall. This type of housing structure involves relatively great expense.

In another ionization fire alarm that is disclosed in German patent application No. 24 15 479 a bowl-like, air permeable external electrode is provided for the test chamber. Furthermore, aside from its tubular section, the housing is equipped with a frontally closing cover.

This cover consists of an approximately flat bottom that is set parallel to the center electrode and spaced a small axial distance from the plane of the outer end of the tubular housing component. The diameter of the cover is identical to the outer diameter of the tubular housing component. A jacket which is connected to the inside of the bottom is turned toward the center electrode. The jacket has an outer diameter that is smaller than the inner diameter of the tubular housing, although the jacket is larger than the diameters of the center and external electrodes, and has a length that is approximately equal to half the distance between the bottom and the center electrode-carrying planar insulator. The cover also has connector elements, which connect the jacket to the inside of the tubular housing section. These connectors, moreover, are spaced apart from each other on the jacket circumference. In this type of construction, a gap remains between the bottom outer edge that projects from the jacket and the outer end of the tubular housing section. On the other hand, there also is a gap between the inside of the jacket and the inside of the tubular housing section (this being a gap interrupted by connector elements), through which ambient air can enter the test chamber. The drawback here is, however, that a complicated housing is required. The housing cannot be manufactured in a one-piece shell mold. Moreover, the approach-flow ambient air can enter the test chamber more readily from a radial direction than from an axial direction. Finally, the external electrode that is seated on the center electrode-carrying insulator is only minimally spaced from the attachment point of the center electrode. This can introduce insulation problems.

The smallest ionization type fire alarm that is not sensitive to different ambient-air approach flow directions is disclosed in German utility patent No. 74 02 420. This fire alarm is similar to the initially noted type in which, however, the center electrode has a substantially larger diameter than has the inner electrode. In this case the ring-shaped wall section interconnecting both tubular wall sections of the insulator is approximately in the plane of the center electrode and carries this center electrode. The switching elements of the alarm transmitter circuit are accommodated in a ring-shaped space that surrounds the reference chamber, so that the excessive axial length can be avoided. The tubular wall section of the insulator joined to the inside of the tubular housing section, however, is positioned in the same axial area as the reference chamber-surrounding tubular wall section which must necessarily have a smaller diameter. In this circumstance, the available volume of the ring-shaped space that surrounds the reference chamber is reduced.

It is an object of the invention to overcome these foregoing difficulties of the prior art.

It is a further object of the invention to provide an improved fire alarm that avoids the problems which have characterized existing devices.

SUMMARY OF THE INVENTION

These problems and difficulties that have been observed in existing fire alarms are overcome, to a great extent through the practice of the invention. Illustratively, the invention relates to an ionization fire alarm in which a test chamber is accessible to ambient air. A reference chamber that is relatively inaccessible to ambient air is axially staged behind and electrically series-switched with the test chamber. At least one radiation source ionizes the gases in the chambers, and a housing containing the chambers has a tubular housing section. Within the housing, an insulator surrounds the reference chamber with an approximately tubular wall section that has a diameter smaller than that of the tubular housing section. A further tubular wall section adjoins the inside of the tubular housing section and an approximately ring-shaped wall section interconnects both of the tubular wall sections. Further in this respect, the insulator carries an internal electrode in the reference chamber. This internal electrode is placed across the alarm axis, and a center electrode which is common to both chambers is parallel to and has approximately the same diameter as the internal electrode.

This combination provides a small device that not only has a pleasing appearance, but also is relatively insensitive to the direction and velocity of the ambient air and is inexpensive to manufacture.

More particularly, the ring-shaped wall section is approximately in the plane of the center electrode. The tubular wall section that adjoins the inside of the tubular housing section surrounds the test chamber and extends from the ring-shaped wall section outward.

The external electrode for the test chamber has a bowl-shape with a flat bottom that is parallel to the center electrode. The flat bottom of the external electrode is approximately in the plane of the outer end of the outward extending tubular wall section. The diameter of the external electrode, moreover, is smaller than the inner diameter of this wall section, although the external electrode diameter is larger than that of the center electrode. The external electrode also has a jacket that extends inwardly from the outer edge of the flat bottom to the ring-shaped wall section. The axial length of this jacket is smaller than the distance between the flat bottom and the center electrode. Further in respect to the jacket, it has circumferentially spaced apart connector elements which interconnect the jacket and the inside of the outward extending wall section.

This structural arrangement establishes a circular gap between the jacket of the external electrode and the outwardly extending, tubular shaped wall section of the insulator. This gap is, of course, interrupted only by connector elements between the external electrode and the tubular shaped wall section. Ambient air can enter the test chamber from the outer frontal side of the alarm through this gap. The air cannot enter the test chamber directly from a radial flow direction. Accordingly, the alarm is protected from having ions swept out of the test chamber because of high velocity air flow. Because ambient air flow through the test chamber is not possible, air reaching the alarm on the frontal side from an axial direction also is captured in the test chamber. Furthermore, between the external and center electrodes there is a sufficiently high insulator resistance, inasmuch as the external electrode is connected to the insulator only at certain points through a few connector devices, because the outer electrode has a larger diameter than has the center electrode; and because the jacket of the outer electrode does not extend to the plane of the center electrode.

It will be recalled that fire alarm tampering is a problem. Frequently, children, vandals and the like will dismantle a fire alarm. To protect the alarm from this unauthorized disassembly, a number of innovative structural features have been provided. An insulator cover embraces the heads of the screw bolts which connect the external electrode to the fire alarm structure. This cover provides further electrical insulation and prevents the cover from being inadvertently twisted. The cover also prevents the bolts from being unscrewed by unauthorized persons and presents overall, a more pleasing appearance for the device.

As a further protection against unauthorized disassembly, the latch springs that connect the alarm to its base are formed with angular bends. These angular bends make it impossible to pull the alarm out of its base through simple axial motion. To remove the alarm from its base, a more complicated combination of rotational and axial movement is required, thereby defeating the child, casual vandal or thief.

Thus, the invention, provides a fire alarm that is not sensitive to air flow direction and velocity, which is compact, aesthetically pleasing in its appearance, less expensive and complicated to manufacture than comparable devices and provide some realistic protection from tampering. Further, in this respect, the dimensions of the alarm can be decreased because the ring space around the reference chamber up to the inside of the tubular housing section provides sufficient space to accommodate the switching elements of the alarm transmitter circuit.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE PREFERRED EMBODIMENTS

DESCRIPTION OF PREFERRED EMBODIMENTS

Figure 1:
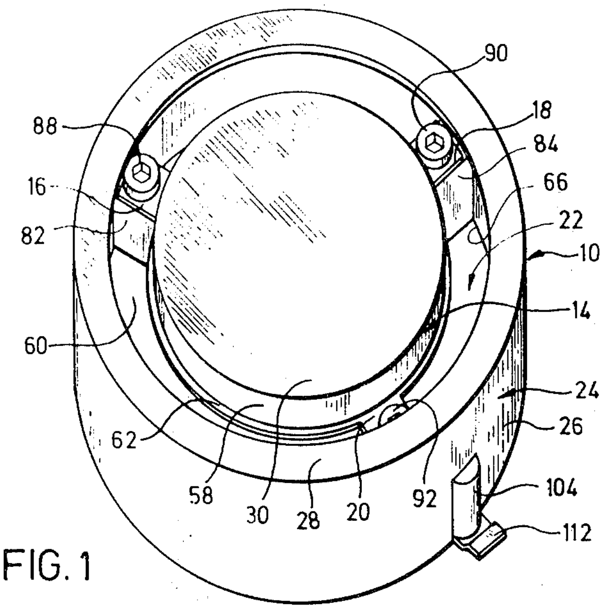
FIG. 1 shows a perspective view of an alarm according to the invention with an insulator cover removed.
Figure 2:
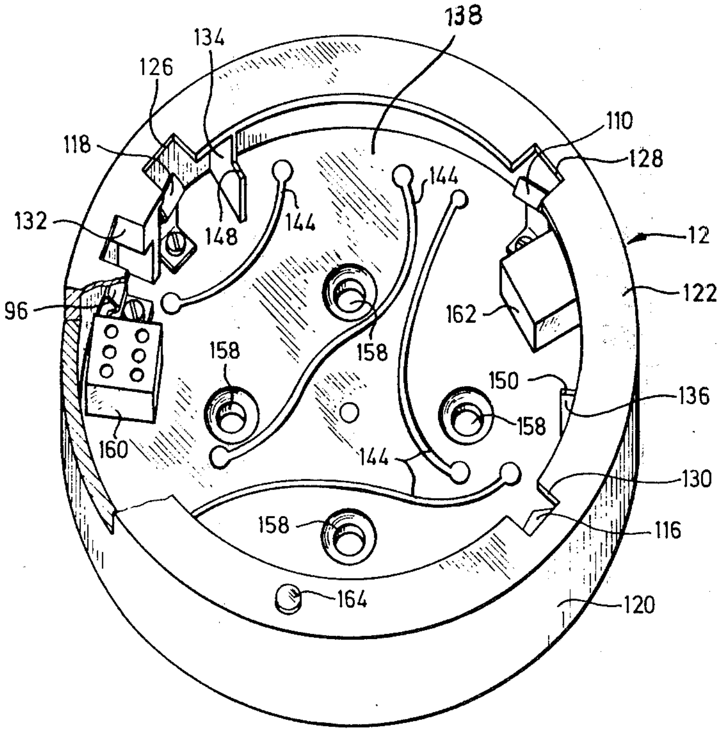
FIG. 2, is a partially broken perspective view of the base that is associated with the alarm shown in FIG. 1.
Figure 3:
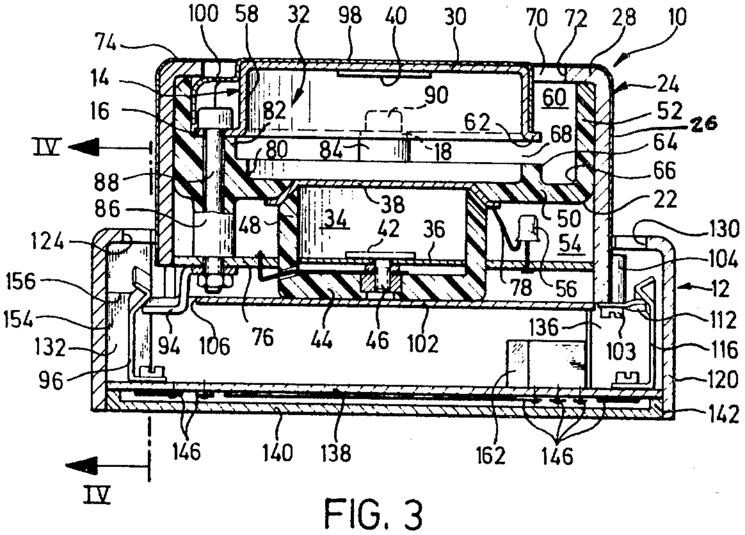
FIG. 3 is a front elevation in full section of an alarm and base according to FIGS. 1 and 2, taken along intersecting line III—III in FIG. 5.

In FIGS. 1, 2 and 3, an alarm A is composed of an alarm insert 10 and a base 12 that receives the insert. As shown in FIG. 3, the complete alarm can be arranged with the alarm insert 10 extending upwardly and axially from the base 12. However, in most cases the alarm A is suspended from a ceiling with the insert 10 projecting downwardly from the base 12 along a vertical axis, or on a wall with a base 12 secured to the wall by a support and the insert 10 extending therefrom along a horizontal axis. For convenience, the expressions "top" and "bottom" will be used to refer to the positions shown in the figures. Also, the upper sides of the alarm insert 10 and the base 12 as shown in FIGS. 1-3 and 5 are designated as outer or frontal sides or portions, and the sides or portions turned toward a supporting wall or ceiling (not shown) to which the base 12 is attached are referred to as the rear or back sides (or portions).

In the perspective view of FIG. 1, the alarm insert has its free front side turned away from the base 12 (FIG. 2). A flat bowl-like outer or external electrode 14 is attached to the inside of an insulator 22 by means of projecting tongues or tabs 16, 18, and 20. A housing 24, composed of a tubular housing section 26 and a ring-shaped wall section 28, surrounds the tongues 16, 18 and 20 and the chambers not shown in FIG. 1. The section 28 lies in the plane of a flat bottom or base 30 of the outer electrode 14 perpendicular to the alarm axis.

The alarm 10 is detachably secured to the base 12 shown in perspective view in FIG. 2. FIG. 3 illustrates details of the internal structure of alarm insert 10.

In FIG. 3, a test chamber 32 accessible to ambient air is axially positioned over or in front of a reference chamber 34. The latter is smaller than the test chamber 32 and specifically has a smaller diameter than the chamber 32. An inner electrode 36 located at the rear end of the reference chamber 34 extends parallel to a center electrode 38 which is approximately the same size as the electrode 36. The center electrode 38 is common to both chambers so the electrodes 36 and 38 are electrically series connected. The flat base 30 of the external electrode 14 is parallel to the center electrode 38 and has a considerably larger diameter than the latter. The insulator 22 surrounds and carries all the electrodes 36, 38, and 14. It further surrounds the test chamber 32 and the reference chamber 34 along the sides not covered by the electrodes 14, 38, and 36. Radiation source 40 or radiation source 42, or both, located beneath base 30 and on the front face of inner electrode 36, produce ionization within the chambers 32 and 34.

The insulator 22 is substantially bowl shaped and sharply stepped at the level of the center electrode 38. At the rear end of the insulator 22 a disk shaped wall section 44 in the center of which the inner electrode 36 is held in an axially adjustable manner by set screw 46. To wall section 44 there is connected a tubular shaped wall section 48 which surrounds reference chamber 34. The outer diameter of this section, which subsequently will be designated as small tubular wall section, is approximately half the inner diameter of tubular housing section 26. Joined to the front (in FIG. 3, upper) end of the small tubular wall section 48 is a radially outward extending, ring-shaped wall section 50 of insulator 22. This ring shaped wall section 50 is approximately located in the plane of center electrode 38, and, because it carries the center electrode on its front side, just about covers the inner diameter of the small tubular wall section 48.

Finally, the insulator 22 comprises a further tubular wall section 52, which adjoins the inside of tubular housing section 26, has a diameter that is relatively larger than that of the small tubular wall section 48, and therefore, subsequently will be designated as large tubular wall section. In accordance with the invention, large tubular wall section 52 axially extends — surrounding text chamber 32 — frontally, i.e., not rearward as with known solutions, with respect to the base 12. In this way, the small tubular wall section 48 and reference chamber 34 establish a surrounding ring space 54 in which sufficient space remains within the tubular housing wall 26 to accommodate switching elements, e.g., a field effect transistor 56. Even if these switching elements 56 do not fill up ring space 54 in particular, it is nevertheless advantageous for reasons of a good heat dissipation and for high quality electrical insulation to have available ample space for these switching elements.

The axial length of the large tubular wall section 52 approximates that of test chamber 32. To be more precise, in the illustrative embodiment shown in FIG. 3, the bottom 30 of external electrode 14 is so located that its outer side aligns with the outside of ring-shaped wall section 28 of housing 24. Bottom 30 as was noted, has a diameter which is larger than that of the center electrode 38, but which nevertheless is smaller than the inner diameter of large tubular wall section 52. A tubular jacket 58 extending inward from the outer edge of bottom 30 to ring-shaped wall section 50, however, has an axial length that is smaller than the distance between bottom 30 and center electrode 48. In the illustrative embodiment, for instance, the axial length of jacket 58 is only a little more than half of the noted distance between the bottom 30 and the center electrode 38. Thus, through a mutually effective dimensioning of external electrode 14 and large tubular wall section 52, a circular gap 60 is produced between the electrode 14 and the wall section 52 through which gap ambient air can enter and leave the test chamber, except for short interruptions by tongues 16, 18, 20 (FIG. 1) which comprise connection points as described subsequently in more complete detail.

Between tongues 16, 18, 20 the axially inner edge of jacket 58 of outer electrode 14 is joined to a radially outward projecting edge 62 of a width that is less than the radial width of gap 60. Furthermore, on its frontal side of ring-shaped wall section 50 is equipped with a ring-shaped shoulder 64 concentric with center electrode 38, which projects frontally in the direction of edge 62. The inner and outer diameters of the shoulder 64 approximate the corresponding dimensions of edge 62 of outer electrode 14. The axial length of shoulder 64 and, in that way, its axial spacing from edge 62, is so selected that between shoulder 64 and edge 62 a jet exit 68 is produced. The cross-sectional area of the jet exit 68 is generally rated at 20% to 50% and in the exemplified embodiment at about 30% of the cross-sectional area of gap 60. The effect of jet exit 68 located between gap 60 and the inside of test chamber 32 is to swirl and retard the ambient air entering test chamber 32. Thereby strong air currents in test chamber 32 are avoided and the suspension time of air vortex circulating ions in test chamber 32 is prolonged. This way a desirably increased insensitivity to high ambient air speeds is achieved. Aside from that, the shoulder 64 has the positive effect of enlarging the inner surface of insulator 22 and consequently of increasing the effective insulation between center electrode 38 and external electrode 14 and between center electrode 38 and housing 24.

Another measure taken for protecting test chamber 32 against strong flow speeds is that gap 60 has an outward jet exit 70 at the level of external electrode bottom 30. This is so accomplished that the radially inward projecting, ring-shaped wall section 28, which is connected in the above-described manner to the outer end of tubular housing section 26 (FIG. 1), has its axially inner side (as is exemplified in the embodiment) supporting the outer end of the large tubular wall section 52 (FIG. 3). And further, as is noted above, the bottom 30 of external electrode 14 is at least approximately in the plane of ring-shaped wall section 28 which wall section 28 projects radially inward over the inside of large tubular wall section 52. An especially practically proven feature is that, as with the exemplified embodiment, not only the outer aperture of gap 60 is narrower than its center section but also that the inner connection of gap 60 to test chamber 32 is effected by jet exit 68. Thus, a particularly good protection against sudden ambient air blasts is provided without permitting weak air currents to produce a strong blocking effect on entering ambient air. This effect probably is based on the fact that an effective compensatory air volume lies between jet exit 70 (produced on the inner edge 72 of ring-shaped wall section 28) and between jet exit 68 (between edge 62 and shoulder 64). This air volume is increased, moreover, by the volume of gap 60 which is radially beyond shoulder 64 and extends to edge 66 at the outside of ring-shaped wall section 50. The gap 60 works as a pre-chamber, which damps or attenuates any stronger air blasts.

In providing both jet exits 68 and 70 in the manner as described with respect to the exemplary embodiment, the practical application for jet exit 70 would involve a cross-sectional area for gap 60 between external electrode 14 and radial inner edge 72 of ring shaped wall section 28 of approximately three-quarters of the cross-sectional area in the inward adjoining axial area. With regard to jet exit 68, however, a still narrower jet exit width also can be selected, in case higher air speeds are to be expected. An especially positive effect is produced, however, if the cross-sectional area of jet exit 70 is somewhat larger than that of jet exit 68, because in this manner under low ambient airflow speed conditions the air can easily enter test chamber 32 despite the presence of jet exits 70, 68.

Another result of this alarm construction is that any contamination in the area of gap 60 or test chamber 32 has practically no effect on alarm operation. To understand this resultant effect, first the electrical construction of the alarm (which represents no part of the invention and which is not shown in the drawing) is briefly described:

Voltage supply for the alarm is provided by battery (not shown) accommodated in base 12 or by a voltage source located in a remote center and connected to the alarm through feeder lines. One pole of the voltage source is directly applied — except for electrical connector elements of negligible resistance value — to external electrode 14. The other pole of the voltage source is connected to electrically conducting housing 24, in which the illustrative embodiment of the housing 24 carries on its outside a coating 74 (drawn in FIG. 3 as a solid line for amplification purposes). The inner electrode 36 is coupled by means of a voltage source connected voltage divider, or the like, to a potential that is between the potentials of external electrode 14 and coating 74. For practical purposes, however, the potential on the inner electrode 36 is closer to the potential on coating 74. Based on the ionization currents flowing in chambers 32, 34, a potential is effective on center electrode 38, which is approximately half-way between the potential on the external electrode 14 and potential on the inner electrode 36. The potential of center electrode 38 controls the alarm transmission circuit which is accommodated in space 54 with its switching elements seated on a switch plate 76. Field effect transistor 56 forms the input of the alarm transmission circuit, and its base connector 78 is connected to center electrode 38. If ambient air loaded with fire by-products such as smoke enter test chamber 32, the ionization current is changed and test chamber 32 becomes more highly resistive. This causes the potential of inner electrode 36 to start drifting, which changes the conductivity state of field effect transistor 56 and triggers a response from the alarm transmission circuit. If so desired, to keep the alarm transmission circuit in an operational state even in the absence of a cause for alarm, feedback can be provided. On responding, the value of the effective resistance is reduced between the voltage source connector connected to coating 74 and the inner electrode 36. In this circumstance, the potential of inner electrode 36 more nearly approximates the potential on the coating 74. Practically, if the coating 74 is grounded, a voltage of 20 V can be applied between coating 74 and external electrode 14. In quiescent conditions, a voltage of 12 V can be applied to series-switched chambers 32, 34, namely 5 V to test chamber 32 and 7 V to reference chamber 34. (In this and subsequent cases voltages are listed only according to their absolute value, not their positive or negative status). The alarm transmitter circuit then responds if the voltage across test chamber 32 has risen to 7 V that is, the voltage differential between external electrode 14 and center electrode 38 has changed by 2 V to 7 V. The original voltage differential of 8 V between inner electrode 36 and coating 74 then is reduced to a substantially lower value by means of feedback.

If during the service life of the alarm, dust particles or dust particles and a sudden temperature change deposit condensation droplets in gap 60 on the inside of large tubular wall section 52 as well as on the balance of the inner surfaces of insulator 22, these inner surfaces assume weak finite conductivity values. This is in contrast to the original clean state of these surfaces in which the conductivty of the surfaces of insulator 22 with respect to the conductivity of chambers 32, 34 is of a negligible low value because of the ionization within the chambers. On the one hand, there exist conductive surface paths leading from the edge of center electrode 38 to tongues 16, 18, 20 of external electrode 14. Thus, in FIG. 3 there is a conductive path from the left edge of center electrode 38 to tongue 16 via inner corner 80. On the other hand, there are inner surface areas of insulator 22 through which a weak-conductive connection exists between center electrode 38 and the conductive coating 74 of housing 24. Typically, this path includes the radial inner area of the inner and, as shown in FIG. 3, lower side of ring shaped wall section 28 and the inner edge 72, which are in the circuit with the connector points that comprise the tongues 16, 18, 20. The conductive inner surfaces between center electrode 38 and external electrode 14 and the conductive surfaces between center electrode 38 and coating 74 produce a voltage divider, the junction point of which is center electrode 38. There is a danger that in this way the potential of center electrode 38 is falsified and the alarm transmission circuit will respond improperly or is kept from sounding a proper response. This can be avoided, however, if the voltage-dividing inner surfaces are so dimensioned, that in the absence of other conditions affecting the potential with respect to the external electrode 14, a voltage is applied to center electrode 38 that at least approximates its value under quiescent conditions with clean, and therefore, nonconducting insulator inner surfaces as well as a nonconducting layer on housing 24.

In practice the alarm design facilitates a check of the applicable dimensioning of the voltage divider being affected by conducting inner surfaces. Typically, the inner electrode 36 is cut off from any voltage supply, at least the radiation source 40 in test chamber 32 is preferably removed. The alarm is supplied with an operational voltage that is applied between coating 74 and external electrode 14. The alarm is exposed to a high dust content atmosphere and alarm is allowed to become highly dust contaminated. In this circumstance, the off-load voltage that is established at center electrode 38 is measured through an instrument which has a sufficiently higher internal resistance relative to the dust-reduced insulator resistances that are effective on the one hand between external electrode 14 and center electrode 38 and, on the other hand, between coating 74 and center electrode 38. If in this condition the insulation resistance between outer electrode 14 and center electrode 38 is too low, then the resultant voltage differential between external electrode 14 and center electrode 38 is lower than it should be under quiescent, or monitoring conditions. Considering the above numerical examples, with a 20-V supply voltage applied between coating 74 and external electrode 14 and with a 5-V off-load voltage between center electrode 38 and external electrode 14, the voltage differential that actually is established between center electrode 38 and external electrode 14 may amount to 4 V. In this case, the insulation between external electrode 14 and center electrode 38 must be improved or the distances between coating 74 and center electrode 38 must be reduced.

To improve the insulation between external electrode 14 and center electrode 38, the number of connector points on the circumference of external electrode 14 can be reduced. According to one embodiment only two connection points are provided instead of the three shown in the drawings. This increases the insulation resistance between outer electrode 14 and center electrode 38 1.5 times. Simultaneously the insulation resistance between coating 74 and center electrode 38 is somewhat reduced because of the increased inner surface inserted between then. In another embodiment the height of jacket 58 is reduced to increase the distance between tongues 16, 18, 20 and center electrode 38. However, in reducing the height of the jacket 58, care is exercised to maintain the measures taken in connection with the gap 60 to establish wind insensitivity. Thus, the axial height of jacket 58 is reduced below half of the distance between bottom 30 and ring-shaped wall section 52 of insulator 22. In another embodiment, the potential of center electrode 38 is shifted in the direction of that of coating 74, the coating 74 is extended in the direction of center electrode 38 by metallizing the inner edge 72, and if required, the inner (and in FIG. 3 the lower) side of ring-shaped wall section 28 is metallized. Finally, if also required, a small area at the outer end of the inside of large tubular wall section 52 is metallized.

Conversely, if on examining this voltage divider, that the dust pollution produced, an excessive voltage differential is established between center electrode 38 and external electrode 14, the above measures can be reversed. For example, the number of connector points provided on the circumference of external electrode 14 can be increased, the axial length of jacket 58 can be extended and the coating 74 on the outside of ring wall section 28 can be reduced so that it does not reach inner edge 72.

Dust contamination has two effects on the potential of operational center electrode 38. First a false potential can be established on the center electrode 38 in the monitoring or quiescent in which the electrode 38 assumes a voltage other than the original one. With the above numerical examples, the contaminated alarm rated potential differential between center electrode 38 and external electrode 14 at equilibrium (that is, the quiescent or monitoring state) is 5 V. In the absence of other factors affecting voltage, the voltage divider effect in these dust conditions produces 4 V. Then, under operational conditions with an electrically connected inner electrode 36 and radiation sources 40, 42, a potential differential of 4.5 V is established because of the contamination in the monitoring state between center electrode 38 and external electrode 14. The result is that the threshold value of 7 V, at which the alarm transmission circuit is triggered, is reached only in greater smoke concentrations. This negative effect, as previously noted, is essentially eliminated by setting the voltage divider as described above. Thus, in the absence of a voltage that is applied to the inner electrode 36 and preferably at least one radiation source 40 and in the presence of an operationally effective voltage between coating 74 and external electrode 14, and with dust contaminated inner surfaces that provide a conductor of electricity up to coating 74, the center electrode 38 should assume a voltage with respect to external electrode 14 which is approximately equal to that voltage which is operationally effective (with inner electrode 36 connected in the presence of radiation sources 40 and 42) even with non-conductive inner surfaces.

The second negative dust contamination effect on sensitivity, which also influences the voltage divider selection is the inhibiting or biasing effect of the voltage divider on the potential of center electrode 38. This prevents a voltage step increase on the center electrode 38 so that the voltage is less when smoke enters the test chamber 32 that it is with clean inner surfaces. This effect can be compensated in two ways. For this purpose, and in the absence of other voltage influencing factors, the voltage divider is so set that the center electrode 38 assumes a voltage with respect to external electrode 14 which is shifted slightly toward the threshold valve at which the alarm transmission circuit is triggered. Meaning that, with above numeral example, the voltage differential with uncontaminated inner surfaces between center electrode 38 and external electrode 14 amounts to 5 V in the monitoring state and alarm triggering is set at a threshold value of 7 V. In these circumstances, the voltage divider is so dimensioned to permit the center electrode 38 to assume a 6-V voltage differential with respect to external electrode 14. In practice, under alarm monitoring operational conditions, dust pollution still results in a minor increase in the effective voltage differential between center electrode 38 and external electrode 14, e.g., to 5.5 V, but this has no effect on sensitivity, because the same smoke density as in the original clean state enables the center electrode 38 to reach the threshold value of 7 V with respect to outer electrode 14.

At connector points between external electrode 14 and insulator 22 radially outward extending tongues 16, 18, 20 as noted above, are in the plane of the axially inner end of outer electrode 14 that is, the jacket 58. Tongues 16, 18, 20 are attached on the outer foreparts of extensions, of which extensions 82, 84 are visible in FIGS. 1 and 3. They extend from ring wall section 50 of insulator 22 to the level of the inner end of jacket 58 and project radially inward from the inside of large tubular wall section 52 and shoulder 64. The outer surfaces of these extensions form part of the insulation sections between center electrode 38 and tongues 16, 18, 20. For this reason, with dust contaminated surfaces, the insulation resistance between center electrode 38 and outer electrode 14 might be increased also by providing the extensions 82, 84, with a surface that has extensive circuitous ribs instead of a smooth surface. For the same purpose, the extensions do not need to be extended radially inward to the shoulder 64 but a slit could be formed between them that would extend downward to the plane of center electrode 38.

On the backside of ring wall section 52 of the insulator 22 at least two diametrically opposed range spacers 86, or as shown in the illustrative embodiment, three range spacers, are arranged at uniform angular distances. A switch plate 76 adjoins and is attached to the rear of the range spacers 86. The switch plate 76 is ring-shaped and surrounds the reference chamber 34. Range spacers 86 are axially aligned with each of the respective insulator extensions 82, 84 that are provided in reference chamber 32. This makes it possible to connect external electrode 14 and switch plate 76 by means of a number of screwbolts 88, 90, 92 (FIGS. 1,5) through extensions 82, 84 and range spacers 86. Thus, screwbolts 83, 90, 92 each pass axially through tongues 16, 18, 20 respectively, as well as an appropriate extension of which only extensions 82, 84 are shown, one of the space rangers 86 and the switch plate 76. One of the screwbolts 88 simultaneously serves as an electrical connection between external electrode 14 and one of the electrical conductors that are provided (but not shown) on switch plate 76. The screwbolt 88 also serves as a connection to the terminal of a voltage source via latch extension 94 and leaf spring 96 that is provided in base 12. As shown in FIG. 3, the latch extension 94 also is attached to a screwbolt 88, which passes through the latch extension.

Because the alarm supply voltage of the alarm is effective between external electrode 14 and coating 74 of the housing, it is advisable to avoid practical short circuits by covering the outside of external electrode 14 with a layer of insulation. For this purpose, an insulator cover 98 shown only in FIG. 3 of the illustrative embodiment is fitted over external electrode 14. Insulator cover 98 has a bowl shape that matches the shape of external electrode 14. Above tongues 16, 18, 20 and screw bolts 88, 90, 92 moreover, the insulator cover 98 is equipped with extensions 100 which protrude radially outward under the inside of ring wall section 28 to the tubular wall section 52 and axially inward to the level of the heads of screwbolts 88, 90, 92. These insulator cover extensions 100 as visible in FIG. 3, are so bowl-like in their inward section that they embrace part of the circumference of each respective head of a screw bolt 88, 90, 92. This completely prevents inadvertent twisting of insulator cover 98, while it is supported in an axial direction behind edge 72 of ring wall section 28 in the housing 24 that protrudes radially inward over large tubular wall section 52. Viewed from the front, the insulator cover extensions 100 cover tongues 16, 18, 20 and the heads of screw bolts 88, 90, 92, and therefore, provides protection against a short circuit connection between coating 74 of housing 24 and external electrode 14. This cover 28 simultaneously prevents unthreading screwbolts 88, 90, 92 by unauthorized persons and because the internal hexagonal screwbolt heads are concealed, presents an esthetically improved appearance.

Figure 5:
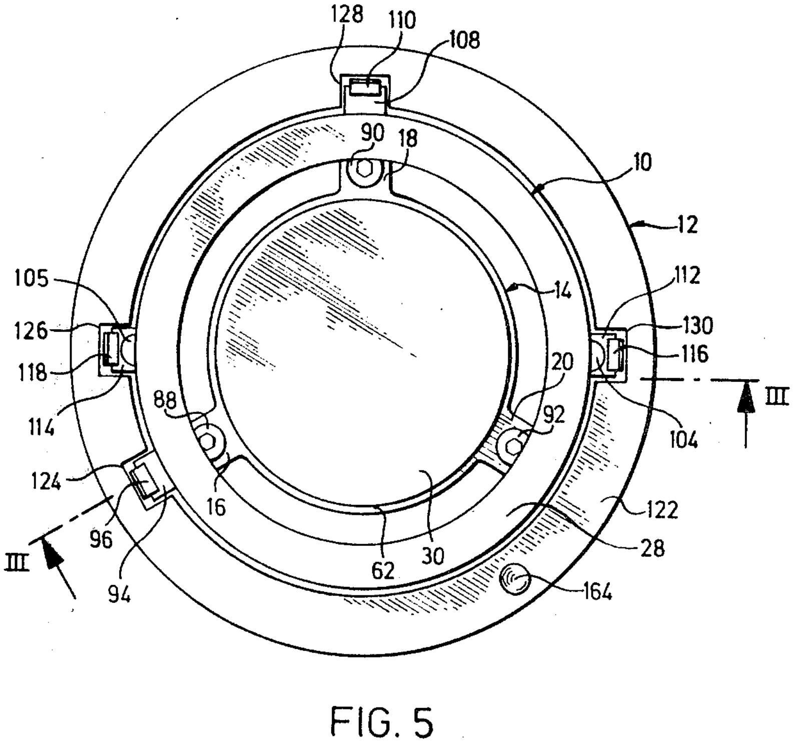
FIG. 5 is a top view of alarm and base according to FIGS. 1 and 4 shown also with the insulator cover removed.

A flat metal sheet 102 is attached on the back of housing 24. The sheet 102 extends perpendicularly to the alarm axis up to the outer edge of tubular housing section 26 and is attached to the housing 26 at diametrically opposed points by means of screws, of which one screw 103 is visible in FIG. 3. The screws are threaded into tapped holes which are accommodated in outward projecting bosses 104 105 (see also FIG. 5) of housing 24. Metal plate 102 adjoins the back of wall section 44 of insulator 22 and holds the insulator 22 inside housing 24. On removing plate 102 the adjusting screw 46 of inner electrode 26 is accessible from the back of insulator 22 for adjusting the spacing between center electrode 38 and inner electrode 36. The plate 102 provides (as does the coating 74 of housing 24 that is electrically connected to the plate 102) a shield for the alarm transmission circuit and chambers 32, 34. Two recesses 106 are formed in the edge of plate 102. Latch extensions 94 and 108 which are used for electrical connections are secured to the switch plate 76. These latch extensions 94, 108 fit into respective recesses, as shown in FIG. 5. Latch extension 108 can be locked by means of spring 110 in a manner equivalent to the way in which spring 96 locks latch extension 94. Further latch extensions 112, 114 are developed as radial extensions of plate 102 and project outward under bosses 104, 105. These latch extensions 112, 114 can be locked by springs 116, 118 respectively again in a manner that is equivalent to the way in which spring 96 locked latch extension 94. Thus, all latch extensions 94, 114, 108, 112 project, as can be seen by comparing FIGS. 1 and 2 with FIG. 5, radially outward from the rear circumference of tubular housing section 26.

As shown in FIGS. 2, 3 and 5 the base 12 has the shape of a hollow cylinder that is open in front. The base 12 comprises a cylindrical jacket 120 and a ring-shaped edge 122 that protrudes radially inward from the jacket 120. The inner opening of the jacket 120 is adapted to the outer diameter of tubular housing wall 26 of alarm insert 10. Cutouts 124, 126, 128, 130 are formed in the ring-shaped edge 122 to enable latch extensions 94, 114, 108, 112 to be inserted into the base 12. From the inside of jacket 120 several ribs extend radially inward of which ribs 132, 134, 136 are visible in the figures. These ribs are connected at their front (and in the figures upper) ends to the ring-shaped edge 122. The rear of the ribs 132, 134, 136, moreover, extend not quite to the rear of jacket 120. The rear of these ribs 132, 134, 136 abut switch plate 138 in the base 12. For shielding purposes the plate 138 is spaced from and is covered on its back with cover 140. The rear of cover 140 is aligned in the same plane with the rear edge of jacket 120. To keep a distance between switch plate 138 of base 12 and cover 140 two insulated range spacers (not shown) can be interposed between them, or, as shown in FIG. 3, the cover 140 can be equipped with an upwardly protruding flanged shoulder 142. Cover 140 and switch plate 138 are connected to jacket 120 by flathead screws which are threaded from the rear of cover 140 into ribs 132, 134, 136. Springs 96, 118, 110, 116 also are mechanically connected to switch plate 138, as well as being in electrical connection with connector paths provided on the switch plate 138. Electrically conductive paths provided on switch plate 138 can run on either top and bottom or on top or bottom of the switch plate 138 as is only schematically indicated in FIG. 2 with conductor paths 144 and in FIG. 3 with conductor paths 146.

Springs 96, 118, 110, 116 extend from switch plate 138 radially outward as is shown in the figures, upward toward edge 122. The outer ends of these springs that are within base 12 are bent radially inward at an angle. These angular bends produce a radially outward flexible type of latch element for engagement with the latch extensions 94, 114, 108, 112.

Alarm insert 10 is detachably attached to base 12 by pushing the alarm insert into the inner opening within the edge 122 of base 12. Because these latch connections are coded by an unsymmetrical angular distribution the latch extensions 94, 114, 108, 112 must be aligned with associated springs 96, 118, 110 and 116.

On pushing the insert 10 into the base 12, the latch extensions 94, 114, 108, 112 lock behind the angular bends of respective springs 96, 118, 110, 116. The alarm insert 10 is thus positioned with its plate 102 seated on the surfaces 148, 150 (FIG. 2) of ribs 134, 136 and on a like seating surface of at least another rib that is not visible in the figures. Ribs 134, 136 and the additional similar type of rib extend radially inward even further from jacket 120 than does edge 122.

Figure 4:
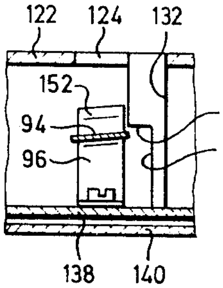
FIG. 4 is a detail of FIG. 3, taken along line IV—IV of FIG. 3.

The angular bends of springs 96, 118, 110, 116 are not exactly in a common plane, but slant circumferentially toward a plane that is perpendicular to the alarm axis. This is shown in a more precise manner in FIG. 4 with respect to the angular bend 152 of spring 96. In this way, the associated latch extension (in FIG. 4, the latch extension 94) is subjected to a tangential force, through which it is automatically shifted in a clockwise direction to the right in FIG. 4 during insertion into base 12. Any possible twisting of the alarm insert is limited in one direction to small angular movement by means of a limit stop 154 that is formed in rib 132. In other rotational direction the motion of the alarm insert is arrested through mutual engagement between latch extension 94 and the angular bend 152 of spring 96. However, in its position, twisted in relation to spring 96, the latch extension 94 abuts with its frontal upper end on a further, axially rearward oriented limit stop 156 in rib 132. For safety reasons, with this construction it is impossible to pull the now locked-in alarm insert 10 out of the base 12 through a simple axial motion. Further in this respect, a rib (not shown) that is approximately diametrically opposed to the rib 132 (FIG. 2) also is arranged in base 12 next to spring 116, through which latching of latch extension 112 is effected.

Of course, other types of limit stop constructions are equally feasible. Rib 132, for example can be developed so that it provides a limit stop similar to limit stop 156 and a limit stop equivalent to the limit stop 154 can be provided by rib 134. To accomplish this modification, unlike this arrangement that is shown in FIG. 2 the combination rib and limit stop is moved nearer to spring 118 in the counterclockwise direction. It is also feasible to combine the structures of ribs such as rib 132 and rib 134. Furthermore, a suitable limit stop that can prevent the axial removal of a rotationally assembled alarm insert 10 can be interposed between housing 24 and edge 122 of base 12. The bosses 104, 105, for example, could be increased in size to extend beyond the area of either recesses 126 or 130 or recesses 126 and 130. This particular configuration, on twisting alarm insert 10 will cause the leading edge of bosses 104, 105 to engage edge 122.

This special latching for alarm insert 10 with base 12 has a key advantage over conventional bayonet lock types. Namely, the alarm insert 10 can be installed in generally inaccessible locations, e.g., the ceiling of a room, without any special tools and without complicated assembly manipulations just by plugging the insert 10 into the base 12. An advantage is nevertheless retained in that alarm insert 10 can be removed from base 12 only through combined rotational and axial movement, which presents an insurance against any unauthorized removal of alarm insert 10.

As shown in the illustrative embodiment, not only are the angular spring bends 152 (FIG. 4) provided in spring 96, but the latch extensions 94, 114, 108, 112 also are positioned in the same slanted way in order to facilitate sliding movement between the angular bends and the latch extensions. To produce the tangential torque between springs (or other latch elements) and latch extensions, and, thus, to establish a corresponding tangential torque between base 12 and alarm insert 10 it is also possible that only latch extensions 94, 114, 108, 112, need be slanted or beveled in order to have them interact.

Developments of base 12 are indicated in the figures only in a partial and schematic way. For example, the bottom of base 12 which consist of switch plate 138 and cover 140 can be equipped (as shown in FIG. 2) with openings 158 to accommodate attachments means. The bottom or jacket 120 also can be equipped with apertures (not shown) that will accept voltage supply cabling. Furthermore, in the interior of base 12 switching means can be arranged on switch plate 138, for example, a binding post block 160 that is visible in FIG. 2, and a relay 162 shown in FIGS. 2 and 3. The base can carry also on its edge 122, as shown in FIGS. 2 and 5, a light-emitting diode 164, which indicates the particular operating state of the alarm. Illustratively, if the diode 164 is blinking the alarm is in a stand-by state. If, however, the alarm is in a responding state, the diode 164 switches over to a steadily burning light.

Thus, there is provided in accordance with the invention a number of features that reflect important improvements over devices that have characterized the prior art. In this respect, the invention presents an axially compact and essentially tamperproof smoke alarm that has an attractive appearance. Not only is this device insensitive to the otherwise undesirable effects of higher velocity air streams, but it also exhibits a uniform sensitivity to smoke without regard to the direction from which the smoke reaches the alarm. All of these advantages are provided by means of a device that is less expensive to manufacture and requires a smaller number of molder parts than prior art smoke alarms.

The embodiments of the invention in which an exclusive property or privilege is claimed are defined as follows:

1. An alarm having a test chamber accessible to ambient air, a reference chamber axially positioned behind and electrically series connected with the test chamber, the reference chamber being less accessible to ambient air, at least one radiation source ionizing the chambers, a housing section in which an insulator surrounds the reference chamber with an essentially tubular wall section that has a diameter which is smaller than that of the tubular housing section, the housing section having a further tubular wall section joined thereto and an approximately ring shaped wall section connecting both tubular wall sections, an internal electrode supported by the reference chamber insulator perpendicular to the alarm axis, a center electrode also supported by the reference chamber insulator common to both chambers and parallel to and having approximately the same diameter as the internal electrode, the invention comprising the ring-like wall section being approximately in the plane of the center electrode, a tubular test chamber wall section that adjoins the inside of tubular housing section and extends axially outward from the ring-like wall section to surround the test chamber, a bowl-like external electrode for the test chamber the external electrode having a flat bottom that is parallel to the center electrode, the external electrode's flat bottom being approximately in the plane of the outer end of outwardly extending tubular test chamber wall section, said external electrode having a diameter that is smaller than the inner diameter of said test chamber wall section and larger than the center electrode diameter, a jacket extending inward from the outer edge of the external electrode bottom to the ring-shaped wall section through an axial distance that is shorter than the distance from the external electrode to the center electrode, and connector elements spaced on the jacket to connect the jacket to the outward extending test chamber tubular wall section in order to form a gap between the jacket and the test chamber tubular wall section for the ambient air.

2. An alarm according to claim 1, further comprising a radially outward projecting edge adjoining the axially inner edge of jacket on the external electrode.

3. An alarm according to claim 1, further comprising a ring-like shoulder on the ring-shaped wall section, the shoulder producing a jet exit that adjoins the axially inner edge of the jacket on the external electrode.

4. An alarm according to claim 3, wherein said cross-sectional area of the jet exit amounts to 20% to 50% of the cross-sectional area of the gap between the jacket and the test chamber tubular wall section.

5. An alarm according to claim 1, further comprising a radially inward projecting ring-like wall section joined to the outer end of the tubular housing section, the axially inner side of said radially inward projecting ring-like housing wall section is at least approximately in the plane of the flat bottom of the external electrode, the ring-like housing wall section protruding over the inside of outward extending test chamber tubular wall section.

6. An alarm according to claim 5, wherein the flat bottom of the external electrode and the ring-like housing wall section establish a further jet exit that is approximately three-quarters of the cross-sectional area of the gap between the test chamber tubular wall section and the jacket.

7. An alarm according to claim 1, wherein the axial length of the jacket of the external electrode is approximately half of the axial distance between the external electrode bottom and the center electrode.

8. An alarm according to claim 1, wherein the connector elements further comprise extensions that protrude from the axially inner end of the jacket on the external electrode, the extensions extending radially inward in the plane of the axial inner end of the jacket, tongues attached to the extensions, the tongues projecting radially inward from the inside of the outwardly extending test chamber tubular wall section the tongues also extending from the interconnecting ring-shaped wall section of the insulator in the plane of the inner end of the jacket.

9. An alarm according to claim 8, wherein the connector elements are spaced from the center electrode and are dimensioned to establish a voltage state with respect to the external electrode relative to the center electrode that is between an off-load voltage and an alarm triggering voltage.

10. An alarm according to claim 8, further comprising at least two range spacers on the ring-like wall section of the insulator, a switch plate circumscribing the reference chamber in a ring-like manner in the plane of the inner electrode, and an alarm transmission circuit connected to the alarm electrodes, the alarm transmission circuit being supported on the switch plate.

11. An alarm according to claim 10, further comprising screw means, the screw means being aligned with respective range spacers, extensions that protrude radially inward from the inside of outward extending test chamber tubular wall section and with respective tongues, the screw means passing through the switch plate.

12. An alarm according to claim 11, further comprising a flat cover for the rear of the housing.

13. An alarm according to claiam 1, wherein the housing is electrically conducting, and a fixed potential coupled to the housing in order to establish a potential differential between the housing and the external electrode that is at least approximately as high as the potential difference between the inner electrode and the external electrode.

14. An alarm according to claim 1, further comprising an insulating layer that covers the external electrode.

15. An alarm according to claim 1, further comprising a base that is selectively detachable from the alarm, latch extension protruding radially from the alarm, latch elements within the base, the latch elements being flexible in a radial direction for axial locking behind the latch extensions.

16. An alarm according to claim 15, wherein the latch extensions and the latch elements of the base are relatively slanted with respect to a common plane that is perpendicular to the alarm axis to enable to latch elements to develop a tangential force on the latch extensions, and at least one stop in the base for cooperation with the tangential force to prevent removal of the alarm from the base through only an axial movement.

* * * * *